US008461253B2

(12) United States Patent  (10) Patent No.: US 8,461,253 B2
Ambrose et al.  (45) Date of Patent: Jun. 11, 2013

(54) ONE-COMPONENT, AMBIENT CURABLE WATERBORNE COATING COMPOSITIONS, RELATED METHODS AND COATED SUBSTRATES

(75) Inventors: Ronald R. Ambrose, Loganville, GA (US); Mark S. Gaston, Tarentum, PA (US); Brian K. Rearick, Allison Park, PA (US); Irina G. Schwendeman, Wexford, PA (US); Venkateshwarlu Kalsani, Gibsonia, PA (US); Hongying Zhou, Allison Park, PA (US); Michael J. Ziegler, Cranberry Township, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 465 days.

(21) Appl. No.: 12/688,393

(22) Filed: Jan. 15, 2010

(65) Prior Publication Data
US 2011/0177352 A1  Jul. 21, 2011

(51) Int. Cl.
C08F 220/18 (2006.01)
C08F 220/28 (2006.01)
C09D 133/06 (2006.01)
C09D 133/14 (2006.01)

(52) U.S. Cl.
USPC ........... 524/561; 524/560; 524/562; 524/592; 524/598; 524/818; 524/832; 524/833; 524/853; 525/330.3; 525/330.5; 525/333.3; 525/328.6; 525/328.7; 526/329.2; 106/14.11; 106/14.12; 106/14.13; 106/287.24; 428/461; 428/500

(58) Field of Classification Search
USPC ................ 524/560, 561, 562, 592, 598, 818, 524/832, 833, 853; 525/330.3, 330.5, 333.3, 525/328.6, 328.7; 106/14.11, 14.12, 14.13, 106/287.24; 428/461, 500
See application file for complete search history.

(56) References Cited

U.S. PATENT DOCUMENTS

| | | |
|---|---|---|
| 4,220,679 A | 9/1980 | Backhouse |
| 4,290,932 A | 9/1981 | Wright |
| 4,539,348 A | 9/1985 | Gajria |
| 4,563,372 A | 1/1986 | Kurauchi |
| 4,567,246 A | 1/1986 | Gajria |
| 4,594,363 A | 6/1986 | Blankenship |
| 4,611,028 A | 9/1986 | Peng |
| 4,639,394 A | 1/1987 | Das |
| 4,705,821 A | 11/1987 | Ito |
| 4,728,543 A | 3/1988 | Kurauchi |
| 4,728,545 A | 3/1988 | Kurauchi |
| 4,749,506 A | 6/1988 | Kitahara |
| 4,777,213 A | 10/1988 | Kanda |
| 4,897,434 A | 1/1990 | Shimada |
| 4,920,160 A | 4/1990 | Chip |
| 4,939,189 A | 7/1990 | Tobinaga |
| 4,968,435 A | 11/1990 | Neff |
| 5,071,904 A | 12/1991 | Martin |
| 5,212,273 A | 5/1993 | Das |
| 5,292,797 A | 3/1994 | Göldner |
| 5,331,025 A | 7/1994 | Lavoie |
| 5,340,865 A | 8/1994 | Neff |
| 5,362,772 A | 11/1994 | Uhlianuk |
| 5,494,954 A | 2/1996 | Das |
| 5,508,325 A | 4/1996 | Craun |
| 5,554,671 A | 9/1996 | Craun |
| 5,565,504 A | 10/1996 | Dannhorn |
| 5,576,361 A | 11/1996 | Craun |
| 5,663,240 A | 9/1997 | Simeone |
| 5,667,847 A | 9/1997 | Muller |
| 5,705,559 A | 1/1998 | Sakamoto |
| 5,830,928 A | 11/1998 | Faler |
| 5,977,258 A | 11/1999 | Hille |
| 5,994,492 A | 11/1999 | Graham |
| 6,180,181 B1 | 1/2001 | Verardi |
| 6,291,564 B1 | 9/2001 | Faler |
| 6,329,060 B1 | 12/2001 | Barkac |
| 6,531,541 B1 | 3/2003 | Desai |
| 6,586,097 B1 | 7/2003 | Pascault |
| 6,762,240 B2 | 7/2004 | Swarup |
| 7,001,952 B2 | 2/2006 | Faler |
| 7,091,275 B1 | 8/2006 | Amick |
| 2007/0179240 A1 | 8/2007 | Chalmers |
| 2007/0251423 A1* | 11/2007 | Scheerder et al. ........ 106/287.35 |
| 2009/0163619 A1* | 6/2009 | Hsu et al. ..................... 523/335 |

FOREIGN PATENT DOCUMENTS

DE   19625773 A1 *  1/1998
GB      967051       8/1964

OTHER PUBLICATIONS

English translation of DE 19625773 A1, Jan. 1998.*

* cited by examiner

Primary Examiner — Roberto Rabago
(74) Attorney, Agent, or Firm — William E. Kuss

(57) ABSTRACT

Disclosed are coating compositions that can be one-component, ambient curable, and waterborne. The coating compositions comprise acrylic copolymer resin particles comprising carbonyl functional groups and a crosslinking agent comprising functional groups, such as hydrazide groups, that are reactive with carbonyl groups.

14 Claims, No Drawings

ONE-COMPONENT, AMBIENT CURABLE WATERBORNE COATING COMPOSITIONS, RELATED METHODS AND COATED SUBSTRATES

FIELD OF THE INVENTION

The present invention relates to coating compositions. More particularly, the present invention relates to one-component, ambient curable, waterborne coating compositions. The present invention also relates to methods for using such compositions and substrates at least partially coated with a coating deposited from such compositions.

BACKGROUND INFORMATION

Coating compositions in which all of the components are stored together in a single container, often known as 1-K compositions, are desirable in many cases from the standpoint of, for example, convenience to the end user. Among the properties that such coating compositions should exhibit is storage stability. In other words, the viscosity of the composition should not significantly increase over time to the point in which the composition is no longer suitable for convenient use for depositing a coating.

In many cases, it is desirable to use liquid coating compositions that are borne in water as opposed to organic solvents. This desire stems primarily from environmental concerns with the emission of volatile organic compounds ("VOC") during the painting process.

It is also often desirable to provide coating compositions that are curable under ambient conditions of atmospheric temperature and pressure. Such compositions are, in many cases, preferable over, for example, thermally-cured or radiation cured coating compositions because (i) little or no energy is required to cure the composition, (ii) the materials from which some substrates are constructed cannot withstand elevated temperature cure conditions, and/or (iii) large or complex articles to be coated may not be convenient for processing through thermal or radiation cure equipment.

One solution for achieving a 1-K, waterborne, ambient curable coating composition is to employ a carbonyl group-containing polymer emulsion containing a polyhydrazide compound crosslinker. As water in the emulsion evaporates after the emulsion is applied to a substrate, the hydrazide groups and the carbonyl groups crosslink as a result of dehydration condensation to form a cured film. While various improvements in 1-K, waterborne coating compositions utilizing carbonyl-hydrazide chemistry have been made over the years, it is still desireable to provide further improved compositions.

For example, in certain applications, the coatings may need to be suitable for application to various kinds of substrates, including various plastics and metals, and must exhibit excellent adhesion to each of them. In addition, in certain applications, such as when the coating composition is applied to medical equipment (among other things), the coating must be especially resistant to both water and alcohol. As a result, it would be desirable to provide 1-K, waterborne, ambient curable coating compositions based on carbonyl-hydrazide chemistry that exhibit excellent adhesion to plastic and metal substrates and which exhibit excellent water and alcohol resistance.

SUMMARY OF THE INVENTION

In certain respects, the present invention is directed to waterborne coating compositions, such as 1-K, ambient curable coating compositions. These coating compositions comprise: (a) acrylic copolymer resin particles comprising pendant carbonyl functionality; and (b) a crosslinking agent comprising at least two functional groups reactive with the carbonyl functionality of the acrylic copolymer. In these compositions, the acrylic copolymer resin particles have a calculated glass transition temperature ("Tg") of at least 40° C. and comprise the reaction product of reactants comprising: (i) at least 50 percent by weight, based on the total weight of the reactants, of hydrophobic acrylic monomers, and (ii) an acrylic monomer comprising an aldehyde and/or ketone functional group. In addition, the hydrophobic acrylic monomers comprise: (A) at least 60 percent by weight, based on the total weight of the hydrophobic acrylic monomers, of a styrenic monomer; and (B) an alkyl(meth)acrylate ester of an alcohol wherein the alkyl portion of the alcohol is linear or branched and contains at least 4 carbon atoms.

The present invention is also related to, inter alia, methods for using such coating compositions and substrates at least partially coated with a coating deposited from such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to coating compositions, such as 1-K, waterborne, ambient curable coating compositions. As used herein, the term "1-K" refers to storage stable coating compositions in which all of the composition components are stored together in a single container and the viscosity of the composition does not significantly increase over time to the point in which the composition is no longer suitable for convenient use for depositing a coating. In fact, in certain embodiments, the coating compositions of the present invention exhibit a pot life of up to at least 1 year as determined by the lack of any significant increase in viscosity when stored in a sealed container at 140° F.

As used herein, "waterborne" refers to coating compositions in which the solvent or carrier fluid for the coating composition primarily or principally comprises water. For example, in certain embodiments, the carrier fluid is at least 80 weight percent water, based on the total weight of the carrier fluid. Moreover, certain of the coating compositions of the present invention are "low VOC coating compositions". As used herein, the term "low VOC composition" means that the composition contains no more than three (3) pounds of VOC per gallon of the coating composition. As used herein, the term "VOC" refers to compounds that have at least one carbon atom and which are released from the composition during drying and/or curing thereof. Examples of "VOC" include, but are not limited to, alcohols, benzenes, toluenes, chloroforms, and cyclohexanes.

As used herein, the term "ambient curable" refers to coating compositions that, following application to a substrate, are capable of curing in the presence of ambient air, the air having a relative humidity of 10 to 100 percent, such as 25 to 80 percent, and a temperature in the range of −10 to 120° C., such as 5 to 80° C., in some cases 10 to 60° C. and, in yet other cases, 15 to 40° C. As used herein, the term "cure" refers to a coating wherein any crosslinkable components of the composition are at least partially crosslinked. In certain embodiments, the crosslink density of the crosslinkable components, i.e., the degree of crosslinking, ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

As previously indicated, the coating compositions of the present invention comprise acrylic copolymer resin particles comprising pendant carbonyl functionality. As used herein, the term "copolymer" refers to polymers that are the reaction product of two or more different reactants, such as two or more different monomers. As used herein, "polymer" encompasses oligomers and prepolymers, the prefix "poly" referring herein to "two or more". As used herein, the term "acrylic copolymer" refers to a copolymer of two or more acrylic reactants, such as two or more different acrylic monomers, i.e., two or more different polymerizable ethylenically unsaturated reactants. As used herein, "carbonyl" refers to a functional group comprising a carbon atom double-bonded to an oxygen atom (C=O).

In the coating compositions of the present invention, the acrylic copolymer resin is present in the form of particles that are in the dispersed phase of an emulsion in which water is the primary component, in some cases the exclusive component, of the continuous phase. In certain embodiments, these resin particles have a size that is uniformly small, i.e., after polymerization less than 20 percent of the resin particles have a particle size of greater than 5 micron, in some cases greater than 1 micron. In certain embodiments, the resin particles have a mean diameter of no more than 500 nanometers, such as no more than 400 nanometers, no more than 300 nanometers, or, in some cases, no more than 200 nanometers. Moreover, in certain embodiments these resin particles have a mean particle size of at least 1 nanometer, such as at least 5 nanometers, at least 10 nanometers, at least 50 nanometers, or, in some cases, at least 100 nanometers. The particle size can be measured by photon correlation spectroscopy as described in International Standard ISO 13321. The average particle size values reported herein are measured by photon correlation spectroscopy using a Malvern Zetasizer 3000HSa according to the following procedure. Approximately 10 mL of ultra filtered deionized water and 1 drop of a homogenous test sample are added to a clean 20 mL vial and then mixed. A cuvet is cleaned and approximately half-filled with ultrafiltered deionized water, to which about 3-6 drops of the diluted sample is added. Once any air bubbles are removed, the cuvet is placed in the Zetasizer 3000HSa to determine if the sample is of the correct concentration using the Correlator Control window in the Zetasizer Software (100 to 200 KCts/sec). Particle size measurements are then made with the Zetasizer 3000HSa.

In certain embodiments, the acrylic copolymer resin particles are the predominant, or, in some cases, essentially the sole source of resin solids in the coating compositions of the present invention. As a result, in certain embodiments, such resin particles are present in the coating compositions of the present invention in an amount of at least 50 percent by weight, such as at least 70 percent by weight, at least 80 percent by weight, at least 90 percent by weight, or, in some cases, at least 92 percent by weight, based on the total weight of resin solids in the coating composition.

In certain embodiments, the coating compositions of the present invention are substantially, or, in some cases, completely free of any other resin particles, such as polymer particles having a mean diameter in the range of from 1 to 50 nanometers. In this context, "essentially free" means that the other resin particles are present in the composition in an amount of less than 1 percent by weight, such as no more than 0.5 percent by weight or no more than 0.1 percent by weight, based on the total weight of resin solids in the coating composition. "Completely free" means that other polymer particles are not present in the composition at all.

The acrylic copolymer resin particles included in the coating compositions of the present invention are the reaction product of reactants comprising: (i) at least 50 percent by weight, based on the total weight of the reactants, of hydrophobic acrylic monomers, and (ii) an acrylic monomer comprising an aldehyde and/or ketone functional group.

Acrylic monomers comprising an aldehyde and/or ketone functional group, as used herein, refers to acrylic monomers comprising at least one group represented by the structure:

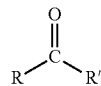

wherein R is a monovalent hydrocarbon group and R' is hydrogen or a monovalent hydrocarbon group. Specific examples of suitable such monomers include, but are not limited to, those listed in U.S. Pat. No. 4,786,676 at col. 3, lines 39-56; U.S. Pat. No. 4,959,428 at col. 2, lines 29-56; and U.S. Pat. No. 5,447,970 at col. 2, line 59 to col. 3, line 15, the cited portions of which being incorporated herein by reference. Such monomers can be used singly or in mixtures thereof. In fact, it was a surprising discovery that the use of a monomer comprising an aldehyde and/or ketone functional group was critical to obtaining 1-K waterborne coating compositions exhibiting good adhesion to a variety of plastic and metal substrates.

In certain embodiments, the acrylic monomer comprising an aldehyde and/or ketone functional group is present in an amount of 0.1 to 20 percent by weight, such as 1 to 20 percent by weight, or, in some cases, 1 to 10 percent by weight, based on the total weight of the reactants used to make the acrylic copolymer resin particles.

As used herein, the term "hydrophobic acrylic monomer" refers to acrylic monomers that are insoluble in water. Examples of hydrophobic acrylic monomers, both of which are utilized in the compositions of the present invention, are (i) alkyl(meth)acrylate esters of an alcohol wherein the alkyl portions of the alcohol is linear or branched and contains at least 4 carbon atoms, and (ii) styrenic monomers. In some cases, the hydrophobic acrylic monomers utilized in the present invention consist essentially of, or, in some cases, exclusively of, styrenic monomers and alkyl(meth)acrylate esters of an alcohol wherein the alkyl portion of the alcohol is linear or branched and contains at least 4 carbon atoms.

In the coating compositions of the present invention, the hydrophobic acrylic monomers are present in an amount of at least 50 percent by weight, such as at least 60 percent by weight, at least 70 percent by weight, at least 80 percent by weight, at least 85 percent by weight or, in some cases, at least 90 percent by weight, based on the total weight of the reactants used to make the acrylic copolymer resin particles. In certain embodiments, the hydrophobic acrylic monomers are present in an amount of no more than 99 percent by weight, such as no more than 95 percent by weight, based on the total weight of the reactants used to make the acrylic copolymer resin particles As used herein, the term "styrenic monomer" generally refers to arene compounds (non-limiting examples including benzene, toluene and naphthalene) containing a vinyl substituent group. Non-limiting examples of styrenic monomers include those having 8 to 18 carbon atoms per molecule, such as those having 8 to 12 carbon atoms. Specific examples include, but are not limited to, styrene, p-methyl styrene, alpha-methyl styrene, tertiary butyl styrene, dimethyl styrene, 3-methylstyrene, 2-ethylstyrene, 3-ethylstyrene, 4-ethylstyrene, 4-n-proplystyrene, 4-cyclohexylstyrene, 4-decylstyrene, 2-ethyl-4-benzylstyrene, 4-(4-phenyl-n-butyl) styrene, 1-vinylnaphthalene, 2-vinylnaphthalene, nuclear brominated or chlorinated derivatives thereof and combinations thereof.

In the coating compositions of the present invention, the styrenic monomer is present in an amount of at least 60 percent by weight, such as at least 70 percent by weight, based on the total weight of hydrophobic acrylic monomers used to make the acrylic copolymer resin particles. In certain embodiments, the styrenic monomer is present in an amount of no more than 90 percent by weight, such as no more than 80 percent by weight, based on the total weight of hydrophobic acrylic monomers used to make the acrylic copolymer resin particles.

As used herein, "(meth)acrylate", and like terms, is meant to encompass both acrylates and methacrylates. As indicated, the hydrophobic acrylic monomers used to make the acrylic copolymer resin particles present in the coating compositions of the present invention comprise an alkyl(meth)acrylate ester of an alcohol wherein the alkyl portion of the alcohol is linear or branched and contains at least 4 carbon atoms, such as 4 to 14 carbon atoms, 4 to 10 carbon atoms, or, in some cases, 4 to 8 or 6 to 8 carbon atoms. Specific examples of such monomers, which are suitable for use in the present invention, include, but are not limited to, isooctyl acrylate, 4-methyl-2-pentyl acrylate, 2-methyl-butyl acrylate, isoamyl acrylate, sec-butyl acrylate, n-butyl acrylate, 2-ethylhexyl acrylate, isodecyl methacrylate, isononyl acrylate, isodecyl acrylate, and the like, including mixtures thereof.

In certain embodiments of the coating compositions of the present invention, the hydrophobic alkyl(meth)acrylate ester described above is present in an amount of at least 10 percent by weight, such as at least 20 percent by weight, based on the total weight of hydrophobic acrylic monomers used to make the acrylic copolymer resin particles. In certain embodiments, the hydrophobic alkyl(meth)acrylate ester described above is present in an amount of no more than 40 percent by weight, such as no more than 30 percent by weight, based on the total weight of hydrophobic acrylic monomers used to make the acrylic copolymer resin particles.

In certain embodiments, acrylic copolymer resin particles included in the coating compositions of the present invention are the reaction product of reactants in addition to those described above. For example, in certain embodiments, the reactants further comprise a phosphate-functional monomer, i.e., an acrylic monomer with phosphate functionality. Examples of such monomers include phosphoethyl(meth) acrylate and the polymerizable phosphate ester compounds having the formula:

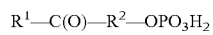

$$R^1—C(O)—R^2—OPO_3H_2$$

which are described in U.S. Pat. No. 6,534,597 at col. 2, lines 30-46, the cited portion of which being incorporated herein by reference.

Suitable phosphate-functional monomers are also commercially available and include those sold by Rhodia as SIPOMER PAM-100.

In certain embodiments of the coating compositions of the present invention, a phosphate-functional monomer is present in an amount of at least 0.1 percent by weight, such as at least 0.5 percent by weight, based on the total weight of acrylic monomers used to make the acrylic copolymer resin particles. In certain embodiments, a phosphate-functional monomer is present in an amount of no more than 5 percent by weight, such as no more than 2 percent by weight, based on the total weight of acrylic monomers used to make the acrylic copolymer resin particles.

Other suitable monomers for use in preparing the acrylic copolymer resin particles include hydrophilic monomers, i.e., monomers that are soluble in water, as well as partially hydrophilic monomers. Specific examples include, but are not limited to, acrylic acid, methacrylic acid, fumaric acid, maleic acid, itaconic acid, crotonic acid, oligomeric acrylic acid, 2-hydroxyethyl acrylate, alkyl(meth)acrylate esters of an alcohol wherein the alkyl portion of the alcohol has 1 to 2 carbon atoms, such as methyl (meth)acrylate, ethyl (meth) acrylate, N-vinyl-2-pyrrolidone, and mixtures thereof.

When used, the amount of the foregoing hydrophilic and/or partially hydrophilic monomer used to make the acrylic copolymer resin particles, is often no more than 2 percent by weight, such as no more than 1 percent by weight, or in some cases, no more than 0.5 percent by weight, based on the total weight of acrylic monomers used to make the acrylic copolymer resin particles.

In certain embodiments, the weight average molecular weight (Mw) of the acrylic copolymer particles ranges from, for example, 10,000 to 1,000,000 grams per mole, such as 50,000 to 500,000, or, in some cases, 50,000 to 200,000 grams per moles, as determined by gel permeation chromatography using a polystyrene standard.

In certain embodiments, the calculated Tg of the acrylic copolymer particles is at least 40° C., or in some cases, at least 45° C. In certain embodiments, Tg of the acrylic copolymer particles is no more than 70° C., such as no more than 60° C., or in some cases, no more than 55° C. In certain embodiments, the acid value of the acrylic copolymer particles is less than 5, such as less than 4. As used herein, the "calculated Tg" of a polymer refers to the Tg of a theoretical polymer formed from the selected monomers, in their selected amounts, calculated as described in "The Chemistry of Organic Film Formers," D. H. Solomon, J. Wiley & Sons, New York, 1967, p. 29.

If acid functional groups are present on the acrylic copolymer particles, they can be neutralized using, for example, amines, such as dimethylethanolamine, ammonia, triethanolamine, dimethylethyl ethanolamine or N',N'-dimethyl aminopropylamine or alkali metal salts such as sodium or potassium hydroxide.

The emulsion comprising the foregoing acrylic copolymer particles dispersed in an aqueous continuous phase can be prepared, for example, by latex emulsion polymerization of the polymerizable reactants mentioned above. In certain embodiments, a surface active agent may be added to the aqueous continuous phase to stabilize, or prevent coagulation or agglomeration of the monomer droplets, especially during polymerization.

The surface active agent can be present in the latex emulsion at any level that stabilizes the emulsion. The surface active agent may be present at least 0.001 percent by weight, often times at least 0.005 percent by weight, at least 0.01 percent by weight, or at least 0.05 percent by weight, based on the total weight of the latex emulsion. The surface active agent may be present at up to 10 percent by weight, often times up to 7.5 percent by weight, up to 5 percent by weight, or in some cases up to 3 percent by weight based on the total weight of the latex emulsion. The level of the surface active agent used is determined by the amount required to stabilize the latex emulsion.

The surface active agent may be an anionic, cationic, or nonionic surfactant or dispersing agent, or compatible mixtures thereof, such as a mixture of an anionic and a nonionic surfactant. Suitable cationic dispersion agents that may be used include, but are not limited to, lauryl pyridinium chloride, cetyldimethyl amine acetate, and alkyldimethylbenzylammonium chloride, in which the alkyl group has from 8 to 18 carbon atoms.

Suitable anionic dispersing agents include, but are not limited to, alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium octylphenoxypolyethoxyethyl sulfate, having 1 to 5 oxyethylene units, and the like.

Specific examples of suitable anionic surfactants include sodium lauryl sulfate (Duponol C or QC from Du Pont), sodium mixed long chain alcohol sulfates available from Du Pont under the designation Duponol WN, sodium octyl sulfate available from Alcolac, Ltd. under the designation Sipex OLS, sodium tridecyl ether sulfate (Sipex EST), sodium lauryl ether sulfate (Sipon ES), magnesium lauryl sulfate (Sipon LM), the ammonium salt of lauryl sulfate (Sipon L-22), diethanolamino lauryl sulfate (Sipon LD), sodium dodecylbenzene sulfonate (SIPONATE® DS), the sodium laureth sulfate, magnesium laureth sulfate, sodium laureth-8 sulfate, magnesium laureth-8 sulfate mixture sold under the name of Texapon ASV by Cognis; the sodium lauryl ether sulfate ($C_{12-14}$ 70/30) (2.2 EO) sold under the names Sipon AOS 225 or Texapon N702 Paste by Cognis; the ammonium lauryl ether sulphate ($C_{12-14}$ 70/30) (3 EO) sold under the name Sipon Lea 370 by Cognis; and the ammonium ($C_{12-14}$) alkyl ether (9 EO) sulfate sold under the name Rhodapex AB/20 by Rhodia Chimie.

Reactive surfactants are suitable for use, often in combination with one or more of the aforementioned anionic surfactants. Examples of such reactive emulsifiers include, but are not limited to, reactive anionic surfactants, sulfosuccinate reactive anionic surfactants, and alkenyl succinate reactive anionic surfactants, such as the commercially available sulforsuccinate reactive anionic surfactants LATEMUL S-120, S-120A, S-180 and S-180A (products of Kao Corp.), and ELEMINOL JS-2 (product of Sanyo Chemical Industries, Ltd.) and the commercially available alkenyl succinate reactive anionic surfactant LATEMUL ASK (product of Kao Corp.).

Other suitable reactive surfactants are $C_{3-5}$ aliphatic unsaturated carboxylic acid sulfoalkyl (containing 1 to 4 carbon atoms) ester surfactants, for example, (meth)acrylic acid sulfoalkyl ester salt surfactants such as 2-sulfoethyl (meth)acrylate sodium salt and 3-sulfopropyl (meth)acrylate ammonium salt; and aliphatic unsaturated dicarboxylic acid alkyl sulfoalkyl diester salt surfactants, such as sulfopropylmaleic acid alkyl ester sodium salt, sulfopropylmaleic acid polyoxyethylene alkyl ester ammonium salt and sulfoethylfumaric acid polyoxyethylene alkyl ester ammonium salt; maleic acid dipolyethylene glycol ester alkylphenolether sulfates; phthalic acid dihydroxyethyl ester (meth)acrylate sulfates; 1-allyloxy-3-alkyl phenoxy-2-polyoxyethylene sulfates (ADEKA REASOAP SE-10N, product of ADEKA Corp.), polyoxyethylene alkylalkenylphenol sulfates (AQUALON, product of DAI-ICHI KOGYO SEIYAKU CO., LTD.), and ADEKA-REASOAP SR-10 (EO number of moles=10, product of ADEKA Corp.), SR-20 (EO number of moles=20, product of ADEKA Corp.), and SR-30 (EO number of moles=30, product of ADEKA Corp.).

A free radical initiator often is used in the latex emulsion polymerization process. Suitable free radical initiators include, but are not limited to, thermal initiators, photoinitiators and oxidation-reduction initiators, all of which may be otherwise categorized as being water-soluble initiators or non-water-soluble initiators.

Examples of thermal initiators include, but are not limited to, azo compounds, peroxides and persulfates. Suitable persulfates include, but are not limited to, sodium persulfate and ammonium persulfate. Oxidation-reduction initiators may include, as non-limiting examples, persulfate-sulfite systems as well as systems utilizing thermal initiators in combination with appropriate metal ions such as iron or copper.

Suitable azo compounds include, but are not limited to, non-water-soluble azo compounds, such as 1-1'-azobiscyclohexanecarbonitrile, 2-2'-azobisisobutyronitrile, 2-2'-azobis (2-methylbutyronitrile), 2-2'azobis (propionitrile), 2-2'-azobis (2,4-dimethylvaleronitrile), 2-2' azobis (valeronitrile), 2-(carbamoylazo)-isobutyronitrile and mixtures thereof; and water-soluble azo compounds, such as azobis tertiary alkyl compounds, including 4-4'-azobis (4-cyanovaleric acid), 2-2'-azobis (2-methylpropionamidine)dihydrochloride, 2,2'-azobis [2-methyl-N-(2-hydroxyethyl)propionamide], 4,4'-azobis (4-cyanopentanoic acid), 2,2'-azobis (N,N'-dimethyleneisobutyramidine), 2,2'-azobis (2-amidinopropane) dihydrochloride, 2,2'-azobis (N,N'-dimethyleneisobutyramidine) dihydrochloride and mixtures thereof.

Suitable peroxides include, but are not limited to, hydrogen peroxide, methyl ethyl ketone peroxides, benzoyl peroxides, di-t-butyl peroxides, di-t-amyl peroxides, dicumyl peroxides, diacyl peroxides, decanol peroxide, lauroyl peroxide, peroxydicarbonates, peroxyesters, dialkyl peroxides, hydroperoxides, peroxyketals and mixtures thereof.

The Examples herein also illustrate suitable conditions for producing the emulsion comprising the acrylic copolymer resin particles described herein.

As indicated, the coating compositions of the present invention further include a crosslinking agent comprising at least two functional groups reactive with the carbonyl functionality of the acrylic copolymer. In certain embodiments, the crosslinking agent is added to the emulsion during or after formation of the foregoing acrylic copolymer resin particles.

Any nitrogen-containing compound having at least two amine nitrogens reactive with carbonyl groups may be used as the crosslinking agent. Such crosslinking agents may be aliphatic or aromatic, polymeric or non-polymeric, and may be used singly in a combination of two or more. Non-limiting examples of suitable crosslinking agents include compounds comprising at least two hydrazide, i.e., $NH_2$, groups. Specific examples of such compounds are set forth in U.S. Pat. No. 7,115,682 at col. 10, line 12 to col. 11, line 26, the cited portion of which being incorporated herein by reference.

In certain embodiments, the crosslinking agent is present in the composition in an amount such that the amount of functional groups reactive with the carbonyl functionality of the acrylic polymer, for example hydrazide groups, is in the range of 0.02 to 5 equivalents, such as 0.1 to 3 equivalents, or, in some cases, 0.5 to 2 equivalents, per one equivalent of carbonyl group contained in the acrylic copolymer resin particles.

In certain embodiments, the foregoing emulsions that comprise the acrylic copolymer resin particles and crosslinking agent are materials of relatively low viscosity. Emulsions can be prepared directly with a total solids content of from 20 percent to 70 percent, such as 30 to 50 percent. In certain embodiments, such emulsions have a Gardner-Holdt bubble viscosity of "A" to "H".

In the coating compositions of the present invention, after the composition is applied to a substrate and as water in the emulsion evaporates, the hydrazide groups and the carbonyl groups crosslink as a result of dehydration condensation to form a cured film.

In certain embodiments, the coating compositions of the present invention also comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006 now U.S. Pat. No. 7,605,194, which is also incorporated herein by reference.

Example special effect compositions that may be used in the coating compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, which is incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating compositions of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in United States Published Patent Application No. 2006-0014099 A1, which is incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions of the present invention may further contain other optional ingredients such as organic solvents, antifoaming agents, pigment dispersing agents, plasticizers, ultraviolet absorbers, antioxidants, surfactants and the like. These optional ingredients when present are often present in amounts up to 30 percent by weight based on total weight of the coating composition.

In certain embodiments, the acrylic copolymer resin particles present in the coating compositions of the present invention do not comprise an inner layer and an outermost layer as is described in U.S. Pat. Nos. 5,447,970 and 5,472,996. In certain embodiments, the coating composition of the present invention are substantially or, in some cases, completely free of monoketones and monoaldehydes as described in U.S. Pat. No. 4,786,676. In certain embodiments, the coating compositions of the present invention are substantially or, in some cases, completely free of heavy metal ions as described in, for example, U.S. Pat. No. 4,259,070. In certain embodiments, the coating compositions of the present invention are substantially or, in some cases, completely free of any polyurethane resins.

As used herein, the term "substantially free" means, when used with reference to the substantial absence of a material in a coating composition, that such a material is present, if at all, as an incidental impurity. In other words, the material does not affect the properties of the coating composition. As used herein, the term "completely free" means that a material is not present in the composition at all.

The coating compositions of the present invention can be produced by any method well known to the one having an ordinary skill in the art using the above components as raw materials. Suitable methods are described in the Examples herein.

The present invention also relates to methods of using the foregoing coating compositions. These methods comprise applying the coating composition to the surface of a substrate or article to be coated, allowing the composition to coalesce to form a substantially continuous film and then allowing the film to cure.

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like. Indeed, one particular advantage of the coating compositions of the present invention is their surprising ability to adhere strongly to a variety of substrates, including both metal and plastic substrates, while also exhibiting other desirable properties such as alcohol resistance and humidity resistance.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminum tanned or semichrome tanned). If desired, the leather may also be re-tanned; for re-tanning there may be used any tanning agent conventionally employed for re-tanning, e g mineral, vegetable or synthetic tanning agents, e.g., chromium, zirconyl or aluminum derivatives, quebracho, chestnut or mimosa extracts, aromatic syntans, polyurethanes, (co) polymers of (meth) acrylic acid compounds or melamine, dicyanodiamide and/or urea/formaldehyde resins.

In certain embodiments, the coating compositions of the present invention are particularly suitable for application to "flexible" substrates. As used herein, the term "flexible substrate" refers to a substrate that can undergo mechanical stresses, such as bending or stretching and the like, without significant irreversible change. In certain embodiments, the flexible substrates are compressible substrates. "Compressible substrate" and like terms refer to a substrate capable of undergoing a compressive deformation and returning to substantially the same shape once the compressive deformation has ceased. The term "compressive deformation" and like terms mean a mechanical stress that reduces the volume at least temporarily of a substrate in at least one direction. Examples of flexible substrates includes non-rigid substrates, such as woven and nonwoven fiberglass, woven and nonwoven glass, woven and nonwoven polyester, thermoplastic urethane (TPU), synthetic leather, natural leather, finished natural leather, finished synthetic leather, foam, polymeric bladders filled with air, liquid, and/or plasma, urethane elastomers, synthetic textiles and natural textiles. Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises an open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include but are not limited to polystyrene foams, polyvinyl acetate and/or copolymers, polyvinyl chloride and/or copolymers, poly (meth)acrylimide foams, polyvinylchloride foams, polyurethane foams, and polyolefinic foams and polyolefin blends. Polyolefinic foams include but are not limited to polypropylene foams, polyethylene foams and ethylene vinyl acetate ("EVA") foams. EVA foam can include flat sheets or slabs or molded EVA foams, such as shoe midsoles. Different types of EVA foam can have different types of surface porosity. Molded EVA can comprise a dense surface or "skin", whereas flat sheets or slabs can exhibit a porous surface. "Textiles" can include natural and/or synthetic textiles such as fabric, vinyl and urethane coated fabrics, mesh, netting, cord, yarn and the like, and can be comprised, for example, of canvas, cotton, polyester, KELVAR, polymer fibers, polyamides such as nylons and the like, polyesters such as polyethylene terephthalate and polybutylene terephthalate and the like, polyolefins such as polyethylene and polypropylene and the like, rayon, polyvinyl polymers such as polyacrylonitrile and the like, other fiber materials, cellulosics materials and the like.

The coating compositions of the present invention have a wide variety of applications. For example, since coatings resulting from the coating compositions of the present invention adhere well to both plastic and metal substrates, and because they are water and alcohol resistant (as described below) they are particularly suited for use on articles constructed of such substrates and which are likely to be exposed to water and alcohol on a significant basis. Specific examples of such articles are, without limitation, medical equipment, such as Diagnostic, Patient Monitoring and Analytical instruments including magnetic resonance imaging, nuclear medicine, computed tomography, ultrasound, X-ray, as well as universal monocoat direct to plastic or metal (business machines or structural steel market).

The coating compositions of the present invention can be applied to such substrates by any of a variety of methods including spraying, brushing, dipping, and roll coating, among other methods. In certain embodiments, however, the coating compositions of the present invention are applied by spraying and, accordingly, such compositions often have a viscosity that is suitable for application by spraying at ambient conditions.

After application of the coating composition of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. The coating compositions of the present invention may be pigmented or clear, and may be used alone or in combination as primers, basecoats, or topcoats.

The coating compositions of the present invention are curable in the presence of ambient air, the air having a relative humidity of 10 to 100 percent, such as 25 to 80 percent, and a temperature in the range of −10 to 120° C., such as 5 to 80° C., in some cases 10 to 60° C. and, in yet other cases, 15 to 40° C. and can be cured in a relatively short period of time to provide films that have good early properties which allow for handling of the coated objects without detrimentally affecting the film appearance and which ultimately cure to films which exhibit excellent hardness, solvent resistance and impact resistance.

The coating compositions of the present invention have been shown to produce cured coatings that are both resistant to water and alcohol, which is particularly important in certain applications, such as when the coating is applied to medical equipment (among other things) that are often exposed to such materials.

Illustrating the invention are the following examples that are not to be considered as limiting the invention to their details. All parts and percentages in the examples, as well as throughout the specification, are by weight unless otherwise indicated.

EXAMPLE 1

A self-crosslinking waterbased acrylic-latex was made using the components and amounts listed in Table 1 according to the following procedure.

TABLE 1

| Ingredients | Parts by Weight |
|---|---|
| Charge #1 | |
| DI Water | 592.07 |
| Rhodapex AB/20[1] | 4.84 |

TABLE 1-continued

| Ingredients | Parts by Weight |
|---|---|
| Ammonium Carbonate | 0.75 |
| DMEA | 1.91 |
| Charge #2 | |
| DI Water | 215.9 |
| Diacetone Acrylamide[2] | 37.62 |
| Adeka Reasoap SR10[3] | 1.08 |
| Ammonium Carbonate | 0.67 |
| Rhodapex AB/20[1] | 9.60 |
| Methacrylic Acid | 4.0 |
| Methyl Methacrylate | 360.0 |
| Ethyl Hexyl Acrylate | 190.0 |
| Styrene | 200.0 |
| Charge #3 | |
| DI Water | 13.36 |
| Ammonium Peroxydisulfate | 0.83 |
| Charge #4 | |
| DI Water | 79.96 |
| Ammonium Peroxydisulfate | 1.17 |
| Charge #5 | |
| DI Water | 25.49 |
| PAM-100[4] | 8.51 |
| Charge #6 | |
| DI Water | 47.95 |
| Charge #7 | |
| DI Water | 7.30 |
| T-Butyl Hydroperoxide (70%) | 0.58 |
| Charge #8 | |
| DI Water | 27.07 |
| Erythorbic Acid | 0.67 |
| Charge #9 | |
| Sipon L-22 | 2.17 |
| Charge #10 | |
| Adipic Acid Dihydrazide[5] | 19.39 |
| DI Water | 111.9 |
| Charge #11 | |
| Acticide[6] | 0.42 |

[1]Rhodapex AB/20 is from Rhodia.
[2]Diacetone Acrylamide is from Sigma-Aldrich.
[3]Adeka Reasoap SR10 is from Adeka Corporation.
[4]PAM-100 is from Rhodia.
[5]Adipic Acid Dihydrazide is from Japan Fine Chemicals.
[6]Acticide is from Thor Chemicals.

Charge #1 was added to a 5-liter, 4-necked flask equipped with a motor driven stainless steel stir blade, a water-cooled condenser, a nitrogen inlet, and a heating mantle with a thermometer connected through a temperature feedback control device. The contents of the flask were heated to 80° C. and held at that temperature for about 10 minutes for temperature stabilization. During this hold, Charge #3 was premixed and added to the flask over 5 minutes. Then added ⅙ of monomer premixed Charge#2 over 30 minutes and held at 80° C. for 15 minutes. Charge #5 was then added into remaining Charge #2 premix and mixed it for about 15 minutes. Charge #2 remainder was added over 150 minutes and premixed Charge #4 was added over 210 minutes. Charge #6 was used as a rinse for Charge #2. After the completion of Charge #4, the reaction was held for 30 minutes at 80° C. The batch was cooled to 50-60° C. and premixed Charge #7 was added at 50-60° C. and then held for 5 minutes. Charge #8 premix was then added over 5 minutes and held for 30 minutes. After 30 minutes, the contents of the flask were cooled to room temperature, Charge #9 and #10 were added, and held 30 minutes at room temperature. Charge #11 was then added at room temperature and held for 15 minutes. The latex pH was adjusted to 8-9 using dimethylethanolamine. A sample of the acrylic latex was placed in a 120° F. hot room for 4 weeks, and the resin remained as emulsion.

The resulting emulsion had a solids content of 42% measured for 1 hour at 110° C., a density of 8.72 pounds per gallon, and a pH of 9.0. The acrylic latex had a calculated Tg of 50° C., a weight average molecular weight of 116,000 measured in tetrahydrofuron (THF) using Gel Permeation Chromatography (GPC), and a particle size of 126 nanometers measured using Zetasizer 9000HS as described above at 25° C.

EXAMPLES 2-9

Acrylic latexes with varying Tg and/or monomer ratio's were made using the same process and ingredients described in Example 1 except only that the monomer compositions were varied. The compositions of the resins (solid weight %) and the final resin characterization are shown in Table 2.

TABLE 2

| | Example | | | | | | |
|---|---|---|---|---|---|---|---|
| | 2 | 3 | 4 | 5 | 6 | 7 | 8 |
| Methacrylic Acid | 0.49 | 0.49 | 0.49 | 0.49 | 0.48 | 0.53 | 0.49 |
| Methylmethacrylate | 33.8 | 23.6 | 13.4 | 0 | 0 | 0 | 0 |
| 2-Ethylhexylacrylate | 23.2 | 23.2 | 23.2 | 23.2 | 42.1 | 25.2 | 23.2 |
| Styrene | 34.6 | 44.8 | 54.9 | 68.3 | 49.7 | 55.32 | 35.6 |
| PAM-100 | 1.04 | 1.04 | 1.04 | 1.04 | 1.01 | 0 | 1.04 |
| Diacetone Acrylamide | 4.59 | 4.59 | 4.59 | 4.59 | 4.48 | 0 | 4.59 |
| Adipic Acid Dihydrazide | 2.37 | 2.37 | 2.37 | 2.37 | 2.31 | 0 | 2.37 |
| n-Butylmethacrylate | 0 | 0 | 0 | 0 | 0 | 18.95 | 32.7 |
| Solids[1] | 42 | 42 | 41 | 42 | 41 | 42 | 42 |
| Weight/Gallon | 8.68 | 8.63 | 8.59 | 8.55 | 8.50 | NA | NA |
| pH | 8.3 | 7.81 | 8.13 | 8.6 | 8.6 | 8.5 | 8.7 |
| Calculated Tg | 48 | 47 | 46 | 46 | 13 | 33 | 22 |
| Mw[2] | 97k | 138k | 116k | 143k | 109k | 117k | 115k |
| Particle Size (nanometers)[3] | 131 | 141 | 140 | 138 | 201 | 134 | 136 |

[1]Solids content measured for 1 hour at 110° C.
[2]Weight average molecular weight was measured in tetrahydrofuron (THF) using Gel Permeation Chromatography (GPC).
[3]Particle size was measured described above using Zetasizer 9000HS at 25° C.

EXAMPLES 10-17

Coating compositions were prepared using the ingredients and amounts listed in Table 3. Amounts are in grams.

TABLE 3

| | Example | | | | | | | |
|---|---|---|---|---|---|---|---|---|
| Ingredient | 10 | 11 | 12 | 13 | 14 | 15 | 16 | 17 |
| Aquex White Tint[1] | 25.48 | 25.48 | 25.48 | 25.48 | 25.48 | 25.48 | 25.48 | 25.48 |
| Deionized water | 6.37 | 6.37 | 6.37 | 6.37 | 6.37 | 6.37 | 6.37 | 6.37 |

TABLE 3-continued

| Ingredient | 10 | 11 | 12 | 13 | 14 | 15 | 16 | 17 |
|---|---|---|---|---|---|---|---|---|
| Foamaster SA-3[2] | 0.21 | 0.21 | 0.21 | 0.21 | 0.21 | 0.21 | 0.21 | 0.21 |
| Example 5 latex | 48.28 | 0 | 0 | 0 | 0 | 0 | 0 | 0 |
| Example 1 latex | 0 | 48.28 | 0 | 0 | 0 | 0 | 0 | 0 |
| Example 2 latex | 0 | 0 | 48.28 | 0 | 0 | 0 | 0 | 0 |
| Example 3 latex | 0 | 0 | 0 | 48.28 | 0 | 0 | 0 | 0 |
| Example 4 latex | 0 | 0 | 0 | 0 | 48.28 | 0 | 0 | 0 |
| Example 6 latex | 0 | 0 | 0 | 0 | 0 | 48.28 | 0 | 0 |
| Example 7 latex | 0 | 0 | 0 | 0 | 0 | 0 | 48.28 | 0 |
| Example 8 latex | 0 | 0 | 0 | 0 | 0 | 0 | 0 | 48.28 |
| D I Water | 7.79 | 7.79 | 7.79 | 7.79 | 7.79 | 7.79 | 7.79 | 7.79 |
| BYK 346[3] | 1.13 | 1.13 | 1.13 | 1.13 | 1.13 | 1.13 | 1.13 | 1.13 |
| Dowanol PPh[4] | 2.85 | 2.85 | 2.85 | 2.85 | 2.85 | 2.85 | 2.85 | 2.85 |
| Dowanol DPM[4] | 5.71 | 5.71 | 5.71 | 5.71 | 5.71 | 5.71 | 5.71 | 5.71 |
| DSX-1550[5] | 0.42 | 0.42 | 0.42 | 0.42 | 0.42 | 0.42 | 0.42 | 0.42 |
| Aquex Black Tint[1] | 0.64 | 0.64 | 0.64 | 0.64 | 0.64 | 0.64 | 0.64 | 0.64 |
| Halox Flash X-150[6] | 1.13 | 1.13 | 1.13 | 1.13 | 1.13 | 1.13 | 1.13 | 1.13 |

[1]Commercially available from PPG Industries, Inc., Pittsburgh, PA
[2]Defoamer commercially available from Cognis Corporation
[3]Surface additive commercially available from BYK-Chemie
[4]Solvent commercially available from Dow Chemical
[5]A rheology modifier commercially available from Cognis Corporation
[6]A flash rust inhibitor commercially available from Halox, a division of Hammond Group, Inc.

Each of the coating compositions of Examples 10-17 was prepared for testing in the following manner. The compositions were spray applied onto various substrates. The substrates included pretreated steel panels B 1000 P60 and aluminum PT 1500 purchased from ACT Test Panels, Inc; fiber glass composite panels of sheet molded compound (SMC) type Meridian SLI 269 purchased from Standard Placque, Inc.; polycarbonate acrylonitrile butadiene styrene (PC-ABS) panels type GE Cycoloy MC 8002 purchased from Standard Plaque, Inc.; nylon composite panels type GE GTX 902 purchased from ACT Test Panels, Inc.; high impact polystyrene (HIPS) Dow Styron 478 panels purchased from Standard Plaque, Inc. A five minute flash time was allowed before an oven cure of 30 minutes at 140° F.

Cured films were evaluated for adhesion to various substrates, alcohol resistance and humidity resistance. Results are set forth in Table 4.

TABLE 4

| Example | Adhesion | 50 rubs 70% IPA | 50 rubs 100% EtOH | Humidity Resistance |
|---|---|---|---|---|
| 10 | B1000P60: 5B; Steel: 5B; Aluminum: 5B; Nylon composite: 5B; Fiber glass: 5B; Coated SMC: 5B; PC-ABS: 5B; HIPS: 5B | no effect | no effect | good, no red rust spots |
| 11 | B1000P60: 5B; Steel: 5B; Aluminum: 5B; Nylon composite: 5B; Fiber glass: 5B; Coated SMC: 5B; PC-ABS: 5B; HIPS: 5B | no effect | no effect | red rust spots |
| 12 | B1000P60: 5B; Steel: 5B; Aluminum: 5B; Nylon composite: 5B; Fiber glass: 5B; Coated SMC: 5B; PC-ABS: 5B; HIPS: 5B | no effect | no effect | few red rust spots |
| 13 | B1000P60: 5B; Steel: 5B; Aluminum: 5B; Nylon composite: 5B; Fiber glass: 5B; Coated SMC: 5B; PC-ABS: 5B; HIPS: 5B | no effect | no effect | few red rust spots |
| 14 | B1000P60: 5B; Steel: 5B; Aluminum: 5B; Nylon composite: 5B; Fiber glass: 5B; Coated SMC: 5B; PC-ABS: 5B; HIPS: 5B | no effect | no effect | few red rust spots |
| 15 | B1000P60: 5B; Steel: 5B; Aluminum: 5B; Nylon composite: 4B; Fiber glass: 4B; Coated SMC: 4B; PC-ABS: 1B; HIPS: 1B | pick off, mar | advanced pickoff, advanced mar | N/A |
| 16 | B1000P60: 5B; Steel: 5B; Aluminum: 5B; Nylon composite: 5B; Fiber glass: 5B; Coated SMC: 5B; PC-ABS: 0B; HIPS: 5B | no effect | some mar | N/A |

TABLE 4-continued

| Example | Adhesion | 50 rubs 70% IPA | 50 rubs 100% EtOH | Humidity Resistance |
|---|---|---|---|---|
| 17 | B1000P60: 5B; Steel: 5B; Aluminum: 5B; Nylon composite: 4B; Fiber glass: 5B; Coated SMC: 5B; PC-ABS: 2B; HIPS: 3B | mar | pickoff, mar | N/A |

[1]Measured using a test method ASTM D3359 with a paint adhesion test kit commercially available from Paul N. Gardner Company, Inc. The film was scribed with a cross-hatch pattern and an adhesive tape was applied to the scribed area. The tape was then removed and the area was evaluated on a 0B to 5B scale where 0B represents total paint delamination from the substrate and 5B means no paint has been removed.
[2]Tested by immersing a Q-tip into the test solution and rubbing the film surface back and forth 50 times. If the substrate became visible at less than 50 double rubs, then the number of rubs was recorded. Otherwise, the surface was inspected after 50 rubs and evaluated for mar.
[3]Consisted of exposing the coated panels to a humidity chamber set up at 100 F. and 100% RH for 7 days.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A waterborne coating composition comprising:
    (a) acrylic copolymer resin particles comprising pendant carbonyl functionality; and
    (b) a crosslinking agent comprising at least two functional groups reactive with the carbonyl functionality of the acrylic copolymer; and
    (c) a non-reactive surfactant,
    wherein the acrylic copolymer resin particles have a calculated Tg of at least 40° C. and comprise the reaction product of reactants comprising:
        (i) at least 50 percent by weight, based on the total weight of the reactants, of hydrophobic acrylic monomers comprising:
            (A) at least 60 percent by weight, based on the total weight of the hydrophobic acrylic monomers, of a styrenic monomer; and
            (B) an alkyl(meth)acrylate ester of an alcohol wherein the alkyl portion of the alcohol is linear or branched and contains at least 4 carbon atoms, and
        (ii) an acrylic monomer comprising an aldehyde and/or ketone functional group; and
        (iii) a phosphate-functional monomer.

2. The coating composition of claim 1, wherein the acrylic monomer comprising an aldehyde and/or ketone functional group is present in an amount of 0.1 to 20 percent by weight, based on the total weight of the reactants used to make the acrylic copolymer resin particles.

3. The coating composition of claim 1, wherein the hydrophobic acrylic monomers are present in an amount of at least 90 percent by weight, based on the total weight of the reactants used to make the acrylic copolymer resin particles.

4. The coating composition of claim 1, wherein the styrenic monomer is present in an amount of 60 to 80 percent by weight, based on the total weight of hydrophobic acrylic monomers used to make the acrylic copolymer resin particles.

5. The coating composition of claim 1, wherein the alkyl (meth)acrylate ester of an alcohol wherein the alkyl portion of the alcohol is linear or branched and contains at least 4 carbon atoms, comprises an alkyl(meth)acrylate ester of an alcohol wherein the alkyl portion of the alcohol is linear or branched and contains 6 to 8 carbon atoms.

6. The coating composition of claim 1, wherein the alkyl (meth)acrylate ester of an alcohol is present in an amount of 10 to 30 percent by weight, based on the total weight of hydrophobic acrylic monomers used to make the acrylic copolymer resin particles.

7. The coating composition of claim 1, wherein the phosphate functional monomer is present in an amount of 0.5 to 2 percent by weight, based on the total weight of acrylic monomers used to make the acrylic copolymer resin particles.

8. The coating composition of claim 1, wherein the weight average molecular weight of the acrylic copolymer particles ranges from 50,000 to 200,000 grams per mole.

9. The coating composition of claim 1, wherein the calculated glass transition temperature of the acrylic copolymer particles is 40° C. to 60° C.

10. The coating composition of claim 1, wherein the crosslinking agent comprises a compound comprising at least two hydrazide groups.

11. A method of using the coating composition of claim 1, comprising:
    (a) applying the coating composition to a substrate;
    (b) allowing the coating composition to coalesce to form a substantially continuous film on the substrate; and
    (c) allowing the coating composition to cure in the presence of ambient air, the air having a relative humidity of 10 to 100 percent and a temperature of −10 to 120° C.

12. The waterborne coating composition of claim 1, wherein the non-reactive surfactant comprises a surfactant selected from the group consisting of anionic surfactants, cationic surfactants, nonionic surfactants, and compatible mixtures thereof.

13. The waterborne coating composition of claim 1, wherein the acrylic copolymer resin particles form a latex emulsion in water, and wherein the non-reactive surfactant is present in the latex emulsion at up to 10 percent by weight based on the total weight of the latex emulsion.

14. The waterborne coating composition of claim 1, wherein the acrylic copolymer resin particles have a mean diameter of no more than 500 nanometers.

* * * * *